United States Patent Office 2,819,153
Patented Jan. 7, 1958

2,819,153

TESTING KIT FOR IMPREGNITE IN CLOTHING

Edward J. Schantz, Frederick, Md., assignor to the United States of America as represented by the Secretary of the Army, in trust No Drawing. Application June 26, 1950
Serial No. 170,457

14 Claims. (Cl. 23—230)

(Granted under Title 35, U. S. Code (1952), sec. 266)

The invention described herein may be manufactured and used by or for the Government for governmental purposes, without the payment to me of any royalty thereon.

This application is a continuation-in-part of the applicant's original United States application for patent, same subject, Serial No. 628,957, filed in the United States Patent Office, November 15, 1945, now abandoned. Both the original application and the instant application deals generally with the testing of protective fabric and particularly with the testing of fabric impregnated with impregnites, i. e., mustard gas deactivating agents.

The chief object in filing the instant application is to definitely disclose that the impregnites referred to in said original application may be any one, or a mixture of two or more of active chlorine containing organic nitrogen compounds. Excellent examples of impregnite compounds are given in the following table together with the computed active chlorine percentage of each of these compounds.

| Name | Formula | Percent active chlorine |
|---|---|---|
| Aceto 4,6-trichlorophenyl chloramide | $CH_3CON(Cl)C_6H_2Cl_3$ | 12.99 |
| Benzo 2,4,6-trichlorophenyl chloramide | $C_6H_5CON(Cl)C_6H_2Cl_3$ | 10.59 |
| p-Brombenzo 2,4,6-trichlorophenyl chloramide | $BrC_6H_4CON(Cl)C_6H_2Cl_3$ | 8.57 |
| Benzo 2,4-dichlorophenyl chloramide | $C_6H_5CON(Cl)C_6H_3Cl_2$ | 11.80 |
| Aceto 2,4-dichlorophenyl chloramide | $CH_3CON(Cl)C_6H_3Cl_2$ | 14.87 |
| Stearo 2,4,6-trichlorophenyl chloramide | $C_{17}H_{35}CON(Cl)C_6H_3Cl_2$ | 7.13 |
| Palmito 2,4,6-trichlorophenyl chloramide | $C_{15}H_{31}CON(Cl)C_6H_3Cl_2$ | 7.54 |
| Benzenesulfone benzyl chloramide | $C_6H_5SO_2N(Cl)CH_2C_6H_5$ | 12.50 |
| 2,3,5,6-tetrachlorphenylene bis-aceto chloramide | $C_6Cl_4(CH_3CONCl)_2$ | 17.78 |
| 2,5-dichlor 4-phenylene bis-aceto chloramide | $C_6H_2Cl_2(CH_2CONCl)_2$ | 21.50 |
| 4,6-dichlor 3-phenylene bis-aceto chloramide | $C_6H_2Cl_2(CH_2CONCl)_2$ | 21.50 |
| Terephtal bis-2,4,6-trichlorphenyl chloramide | $C_6H_4(CONClC_6H_2Cl_3)_2$ | 11.98 |
| Phthal bis-2,4,6-trichlorphenyl chloramide | $C_6H_4(CONClC_6H_2Cl_3)_2$ | 11.98 |
| Bis (2,4,6-trichlorophenyl chlor)urea | $(C_6H_2Cl_3NCl)_2CO$ | 14.54 |
| Dibenzene sulfonyl ethylene dichloradiamide | $C_6H_5SO_2NClCH_2NClSO_2CH$ | 17.33 |
| Phthal-chloramide | $C_6H_4(CO)_2NCl$ | 19.54 |
| Chlorortho benzoic sulfinide | $C_6H_4CO(SO_2)NCl$ | 16.30 |
| Quinone dichlorimid | $C_6H_4(NCl)_2$ | 40.05 |
| Chlorsuccinimide | $(CH_2CO)_2NCl$ | 26.50 |
| Dibenzoyl ethylene dichlordiamine | $C_6H_5CONClCH_2NClCOC_6H_5$ | 21.04 |
| Benzoyl chlorocarbamide | $C_6H_5CONCHCONCHCl$ | 17.86 |
| Dibenzoyl dichlorcarbamide | $(C_6H_5CONCl)_2CO$ | 20.75 |
| "Halazone" | $COOHC_6H_4SO_2NCl_2$ | 26.26 |
| Bis(dichlorphenylchlor)urea | $(C_6H_3Cl_2NCl_2CO$ | 16.98 |

A further purpose in filing this continuation-in-part application is to disclose that the preferred impregnite solution referred to in the original application is any chloroinated benzene which is formed only of CH and Cl, but that tetrachloroethane may also be used. The latter compound, however, should not be applied in small unventilated closets or rooms for the reason that its fumes are somewhat toxic.

The vesicant action of mustard gas on both personnel and material renders it most necessary for defense agencies and mustard gas producers to provide suitable impregnated fabrics which will prevent such action. The above listed nitrogen compounds have this characteristic to an unusual degree. Unfortunately, however, these impregnites when impregnated in clothing slowly lose their mustard gas deactivating efficiency with the passage of time for the reason that the active chlorine is necessarliy not strongly bonded in the nitrogen compounds as it must be readily available to react with mustard to deactivate the toxicity of the mustard gas. Furthermore the extent to which the fabric can be weighed with impregnite is limited by the fact that the impregnite not only adds to the weight of the cloth but also makes the garment less flexible than could be desired. It is, therefore, highly desirable that the fabric be neither underloaded nor overloaded with the impregnite.

In view of the foregoing, it is necessary to determine both at the time of production of the impregnated fabric and also from time to time thereafter, very definitely whether the impregnite content of the fabric is an amount considered adequate for protection.

Heretofore numerous solutions and processes have been proposed. Some of these proposed compositions and methods are satisfactory when applied in a factory to a small cut out sample of the cloth being made into garments. However they, almost without exception, destroy or seriously weaken the fabric and, therefore, the garments cannot be safely tested by these prior well known methods. Another serious disadvantage which is apparently inherent in the detecting composition and processes of the prior art is they are not well adapted for use in the field.

It is, therefore, one object of my invention to provide a simple tablet which is uniquely adapted to be used in the field to determine whether or not the percentage of the free chlorine in the impregnite is sufficient to be considered safe for protection.

Another purpose of my invention is to provide a rapid dependable process and suitable materials adapted to be used in carrying out this process which may be conveniently applied in the field.

Another object of my invention is to prevent, during the test, free chlorine from being released in the fabric. In practice free chlorine readily attacks cotton and woolen fabrics when they are slightly wetted with water.

In making a test of the character described it is, of course, desirable that the test be made on as small a portion of the fabric as possible and it is one of the advantages of my invention that I preferably use only one drop of the solvent on the impregnite and then add only another drop of an aqueous solution containing an iodide and a substantially less amount, approximately ⅓ as much of a thiosulfate which is calculated to be equivalent to the protective quantity of impregnite. This solution also contains a very small amount of sodium dihexyl sulfosuccinate for the reason that, most unexpectedly and after numerous attempts to find a substitute for this compound, no other wetting agent was found suitable to use in this solution. A buffer such as, for instance, sodium bicarbonate, is also preferably added to adjust and stabilize the aqueous solution to about 8 pH i. e., not below 7.5 pH nor over 8.5 pH. After 2 seconds but not more than 10 seconds the wetted spot is contacted with starch or an absorbent paper impregnated with starch for the presence of free iodine. If the fabric contains sufficient impregnite to provide protection against mustard gas, the wetted portion of the test will indicate the presence of free iodide. If starch or starch paper be used and the amount of free iodide is sufficient to turn the starch to blue black color, this is a clear indication that the impregnite fabric is considered safe for protection against mustard gas. However, if only a small amount of color or no color at all appears on the starch or the starch paper this clearly indicates that the fabric does not contain sufficient impregnite to give the necessary margin of safety. After the above test is completed a drop of a hereinafter described especially prepared solution is dropped on the wetted spot to prevent the fabric from being weakened by acids which would otherwise slowly form from the chemicals used in making this test.

In carrying out my invention I preferably make use of tablets which may be very conveniently used in providing the above mentioned aqueous solution. These tablets should not be more than $7/16$ of an inch in diameter and weigh approximately 1.2 grams. The composition of these tablets is as follows:

| | Parts by weight |
|---|---|
| Potassium iodide (KI) (U. S. P. or C. P.) | 65.6±1.0 |
| Sodium thiosulfate, anhydrous ($Na_2S_2O_3$) | 31.1 |
| Sodium bicarbonate ($NaHCO_3$) (C. P.) | 1.3±0.1 |
| Aerosol MA (sodium dihexyl sulfosuccinate) | 2.6±0.1 |

Methyl cellulose, in a quantity not exceeding 4 percent of the total mix, may be added as a binder to replace an equal quantity of potassium iodide. Mineral oil, in a quantity not exceeding 0.5 percent of the total mix, may be also added as a mold lubricant to replace an equal quantity of potassium iodide.

The above mixture is first finely ground and then pressed into tablets. The tablets should be pressed to such hardness that when 2 tablets are placed in the test solution containing 29 ml. of water at a temperature of 25–30° C., complete solution takes place in not less than 2 nor more than 10 minutes when the bottle is rotated in the hand at a rate of approximately 2 rotations per second and inverted once each minute. Titrate a 10 ml. aliquot of the resulting solution with N/10 solution. The quantity of 0.1000 N iodine solution required to titrate 10 ml. of the test solution is not less than 14.3 ml. nor more than 15.9 ml. (Note.—If this solution does not fall within the prescribed limits, the sodium thiosulfate content of the composition is adjusted until the solution is within the prescribed limits.)

After 2 seconds but not more than 10 seconds, the wetted spot is blotted with a piece of absorbent test paper prepared by dipping absorbent filter paper into a hot solution containing 5% soluble starch and allowing it to dry at room temperature. Fabric containing the predetermined protective amount of impregnite produces a blue black (typical iodine-starch) color. Fabric having insufficient impregnite to provide the requisite protection produces little or no color. When the test is completed a drop of the following neutralizing solution is placed on the wetted spot to protect the fabric.

| | Parts by weight |
|---|---|
| Sodium bicarbonate ($NaHCO_3$) (C. P.) | 74.5±1.0 |
| Sodium acetate, anhydrous ($NaC_2H_3O_2$) | 24.0±0.5 |
| Aerosol MA | 1.5±0.1 |
| Fluorescin | 0.023±0.005 |

The mixture is finely ground and treated for pressing into tablets. Methyl cellulose, in a quantity not exceeding 1.5 percent of the total mix may be added as a binder to replace an equal quantity of sodium bicarbonate. Mineral oil, in a quantity not exceeding 0.5 percent of the total mix may be added as a mold lubricant to replace an equal quantity of sodium bicarbonate.

The ingredients are completely mixed to insure uniform composition. The mixture is thoroughly dried before pressing into tablets to prevent softening and swelling of the tablets on heating at 35° C. The tablets are a maximum of $7/16$ inch diameter and weigh 0.9±0.34 gram. The tablets are pressed to such hardness that when two tablets are placed in a neutralizing solution bottle containing 29 ml. of water, at a temperature of 25–30° C., complete solution takes place in not less than 6 nor more than 30 minutes when the bottle is rotated in the hand at a rate of approximately 2 rotations per second and inverted once each minute.

The neutralizing solution is applied to neutralize any acids which form from the test solution ingredients and thus protects the fabric.

For field practice it is highly advantageous that the test compositions be pressed into tablet form and to be carried thus in a form which may be readily placed in aqueous solution when desired for use.

The principle upon which the test is based is as follows: The potassium iodide in the test solution reacts with the active chlorine of the impregnite to liberate free iodine. The active chlorine in the impregnite however, is directly transferred from the mustard to the potassium without releasing nascent chlorine in the fabric. This is, of course, a very important feature of my invention.

As the free iodine is liberated it is reduced by the sodium thiosulfate. The amount of sodium thiosulfate in the solution is adjusted so that it will reduce an amount of iodine equivalent to that which would be liberated from the potassium iodide by the minimum amount of impregnite in the fabric for safe protection. Thus if more than the minimum amount of impregnite is present there will be more iodine liberated than will be reduced by the sodium thiosulfate and when the starch paper is pressed against the wetted spot on the fabric the paper will turn blue. However, if less than the minimum impregnite is present, all of the iodine liberated by the action of the impregnite with the potassium iodide will be reduced by the sodium thiosulfate and no color will appear on the starch test paper. The amount of sodium thiosulfate in the test solution when and if necessary, can be adjusted to correspond to any predetermined figure for the minimum required protection by the impregnite in the fabric.

In making the composition and the tablets, the quantity of sodium thiosulfate to be placed in the composition is very carefully calculated to correspond to the amount of active chlorine in the impregnite required for the minimum desired protection.

My invention provides a simple method of testing, under field conditions, to determine, without releasing free chlorine in the fabric during the period of the test, the protective value of impregnated fabrics. It is simple and can be performed by men who are not technically trained because the simple presence or absence of color indicates whether or not the tested fabric has the necessary protective value.

The nature of this invention has been broadly outlined above, the preferred embodiments have been described and it will be apparent that certain modifications and additional formulations will suggest themselves to those skilled in the art. Accordingly, it is intended that the foregoing description shall be interpreted as illustrative only and not in a limiting sense.

I claim:

1. A process of testing to determine the mustard gas protective sufficiency of an impregnated fabric, which includes the steps of first moistening a minute integral portion of a fabric impregnated with an organic nitrogen active chlorine containing compound by applying to said portion a drop of a solvent of said compound selected from the group consisting of chlorinated benzene and tetra chloraethane to form a wet spot on said fabric, adding to said spot a drop of an aqueous solution of a finely ground admixture consisting of about 65.6% KI, about 31.1% anhydrous $Na_2S_2O_3$, about 1.3% of sodium bicarbonate and about 2.6% of sodium dihexyl sulfo-succinate and contacting the thus treated portion 2 to 10 seconds thereafter with a white starched impregnated filter paper upon which, in the event of there being said sufficiency, there will appear a definitely colored spot.

2. A process of testing to determine the mustard gas protective sufficiency of an impregnated fabric which includes the steps of first moistening a minute integral portion of a fabric impregnated with an organic nitrogen active chlorine containing compound selected from the group of compounds consisting of

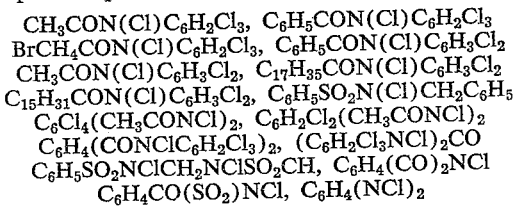
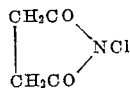
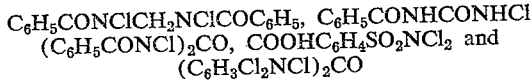

3. The process of claim 1 in which the treated portion of the fabric is finally neutralized with an approximately 8.0–7.5 pH sodium bicarbonate solution.

4. The process of claim 2 in which the treated portion of the fabric is finally neutralized with an approximately 8.0–7.5 pH sodium bicarbonate solution.

5. A water soluble tablet adapted for use in testing fabric impregnated with an active chlorine containing organic nitrogen mustard gas deactivating compound selected from the group of compounds consisting of

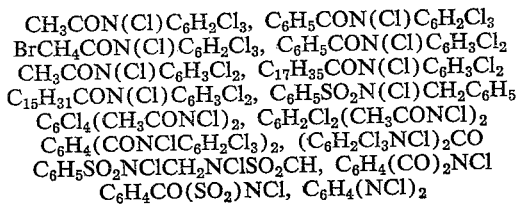
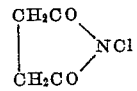
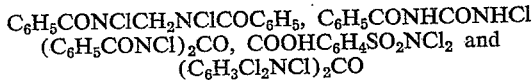

said tablet being completely soluble in not less than 6 minutes nor more than 30 minutes in 29 ml. of agitated water maintained at a temperature of from 25 to 30° C.,
having a diameter not in excess of 7/16 of an inch and a weight of approximately 1.2 grams and consisting of a finely ground compacted mixture of about 65.6% KI, about 31.1 anhydrous $Na_2S_2O_2$ and about 1.3% $NaHCO_3$ and 2.6% sodium dihexyl sulfosuccinate.

6. A tablet of claim 5 in which a quantity of methyl cellulose, not in excess of 4% of the total mixture, and a quantity of mineral oil not exceeding 0.5% of the total mixture, replaces a quantity of KI, equal to the combined percentages of methyl cellulose and mineral oil added to the tablet.

7. A tablet of claim 5 in which a quantity of methyl cellulose replaces a quantity of KI, equal to the combined percentages of methyl cellulose and mineral oil added to the tablet.

8. A tablet of claim 5 in which mineral oil replaces a quantity of KI, equal to the combined percentages of methyl cellulose and mineral oil added to the tablet.

9. The tablet of claim 5 in which ½ of one percent mineral oil is substituted for ½ of one percent KI.

10. The tablet of claim 5 in which a quantity of methyl cellulose, not in excess of 4% of the total mixture, is substituted for a like quantity of KI.

11. An alkaline water soluble tablet weighing approximately 0.9 grams, having a diameter not in excess of 7/16 of an inch and consisting of a compacted molded admixture containing about 74.5% $NaCHO_3$, about 24% $NaC_2H_3O_2$, about 1.5% sodium dihexyl sulfosuccinate and approximately 0.023% fluorescin.

12. The tablet of claim 11 in which a quantity of methyl cellulose, not in excess of 1.5% of the total mixture, is added as a binder and replaces an equal quantity of sodium bicarbonate.

13. The tablet of claim 11 in which a quantity of sodium bicarbonate, not exceeding 0.5% of the total mixture, is replaced in a mixture by an equal quantity of mineral oil.

14. The tablet of claim 11 in which a quantity of methyl cellulose, not in excess of 5% of the total mixture, replaces an equal quantity of sodium bicarbonate, and a quantity of mineral oil, not in excess of 1.5% of the total mixture, replaces an equal quantity of sodium bicarbonate.

References Cited in the file of this patent

UNITED STATES PATENTS 1,840,445    Guernsey _____ Jan. 12, 1932

FOREIGN PATENTS 360,098    Great Britain _____ Nov. 5, 1931

OTHER REFERENCES

Dictionary of Organic Compounds, Heilbron, vol. 1, page 730 (1943).

Fieser and Fieser: Organic Chemistry, 1944, Heath & Co., Boston, page 595.